July 1, 1958            J. J. BLACK            2,841,415
UPPER FIFTH WHEEL LOAD-BEARING FRAME STRUCTURE
FOR SEMI-TRAILERS
Filed Dec. 21, 1956            4 Sheets-Sheet 1
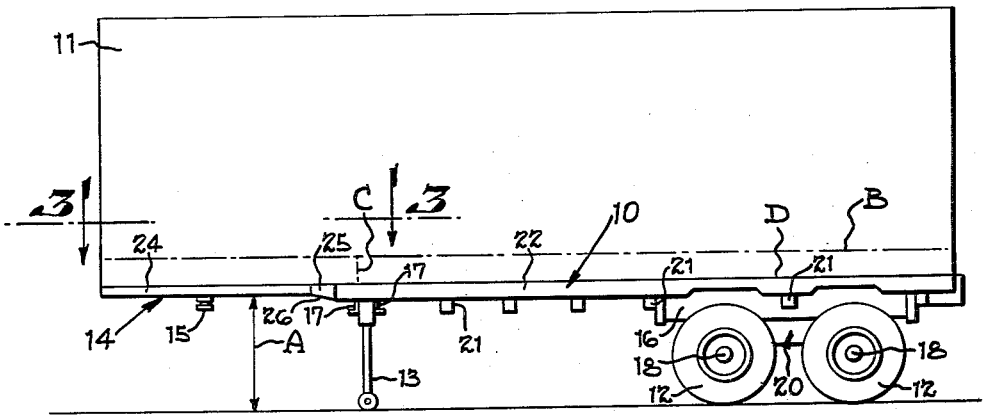
Fig. 1
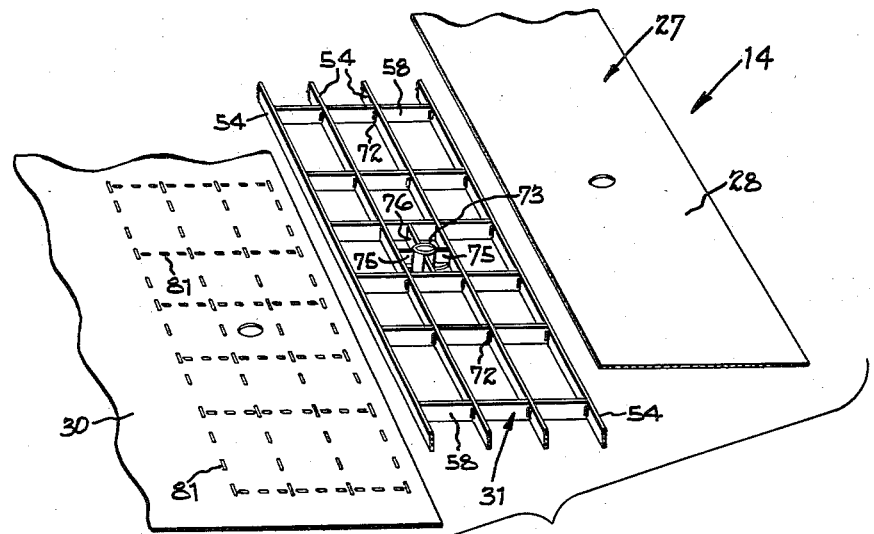
Fig. 2
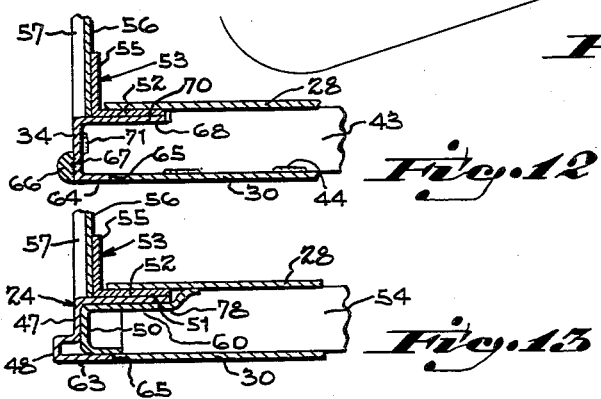
Fig. 12
Fig. 13
INVENTOR.
James J. Black.
BY
Wood, Herron & Evans.
ATTORNEYS.

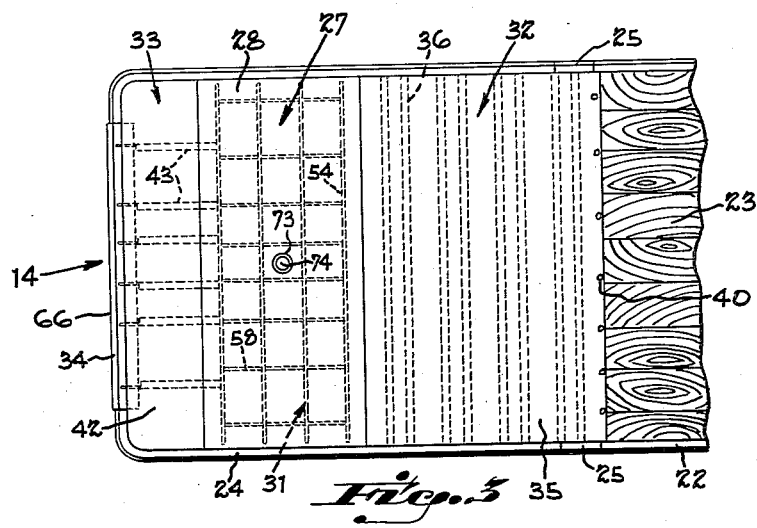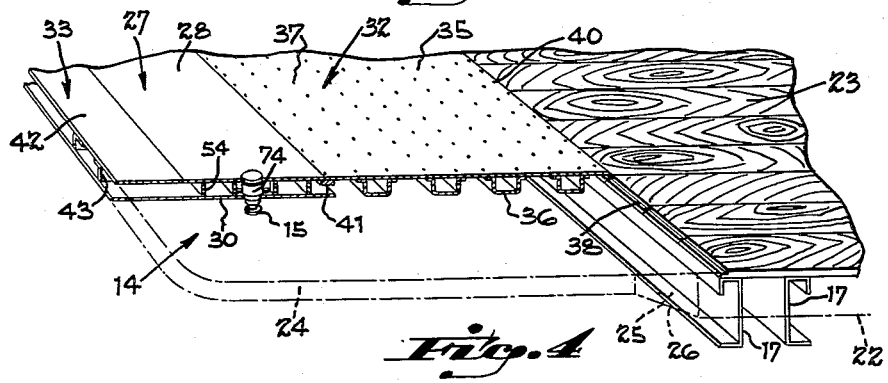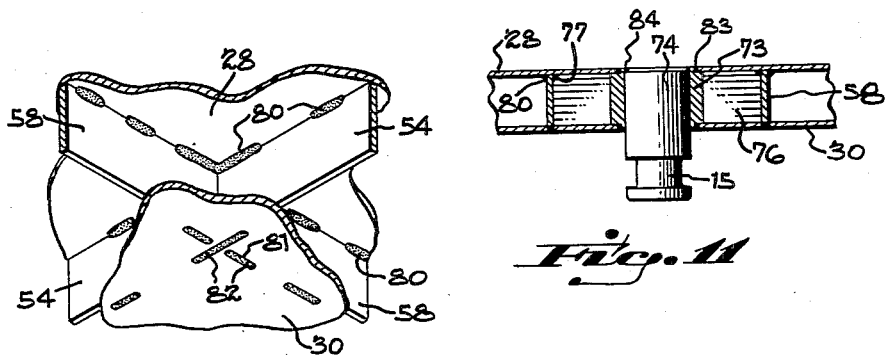

July 1, 1958 J. J. BLACK 2,841,415
UPPER FIFTH WHEEL LOAD-BEARING FRAME STRUCTURE
FOR SEMI-TRAILERS
Filed Dec. 21, 1956 4 Sheets-Sheet 3
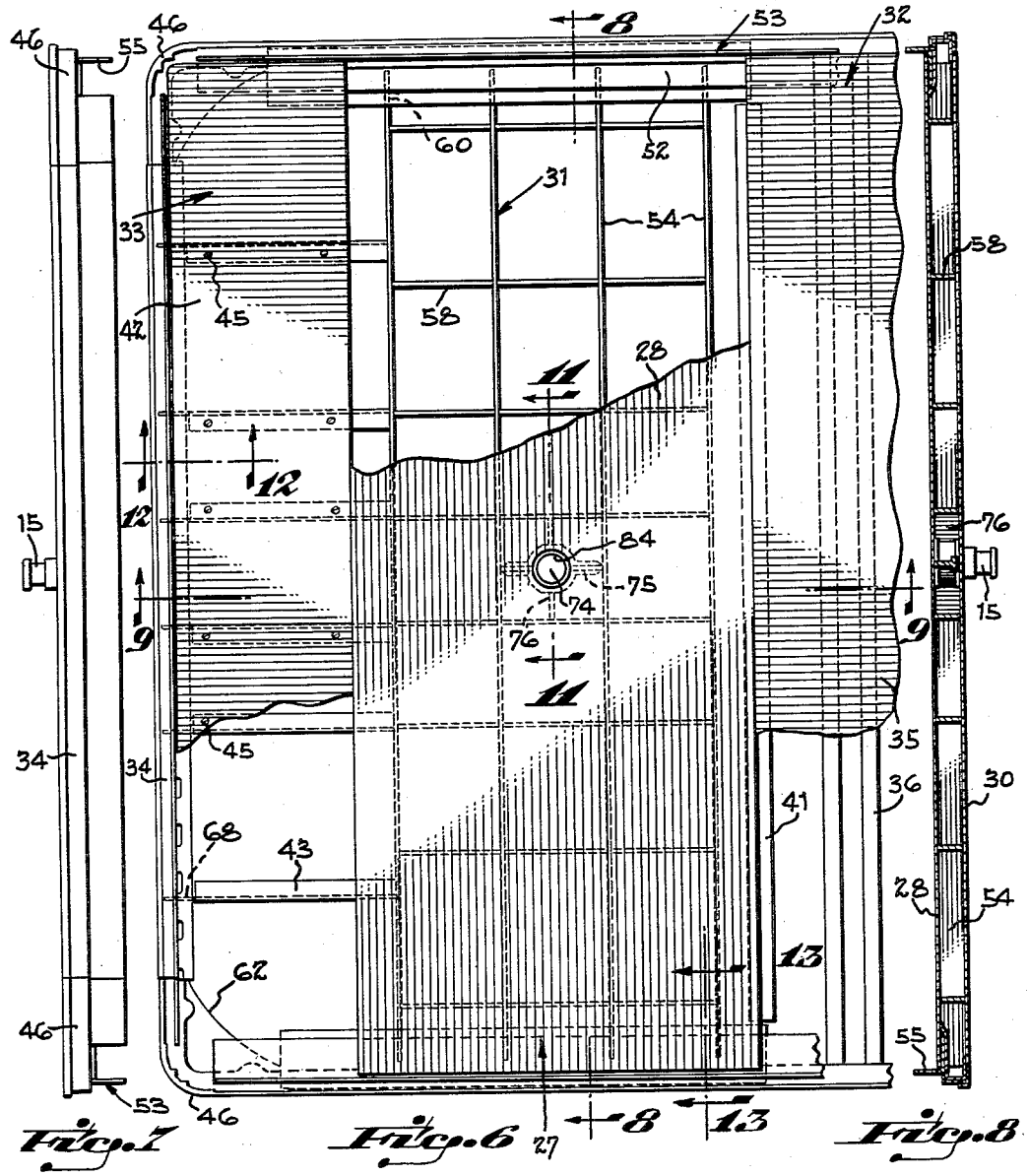
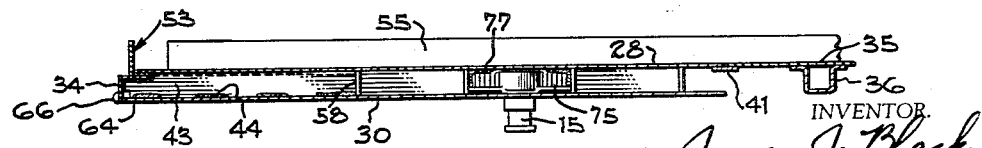
INVENTOR.
James J. Black.
BY
Wood, Herron & Evans.
ATTORNEYS.

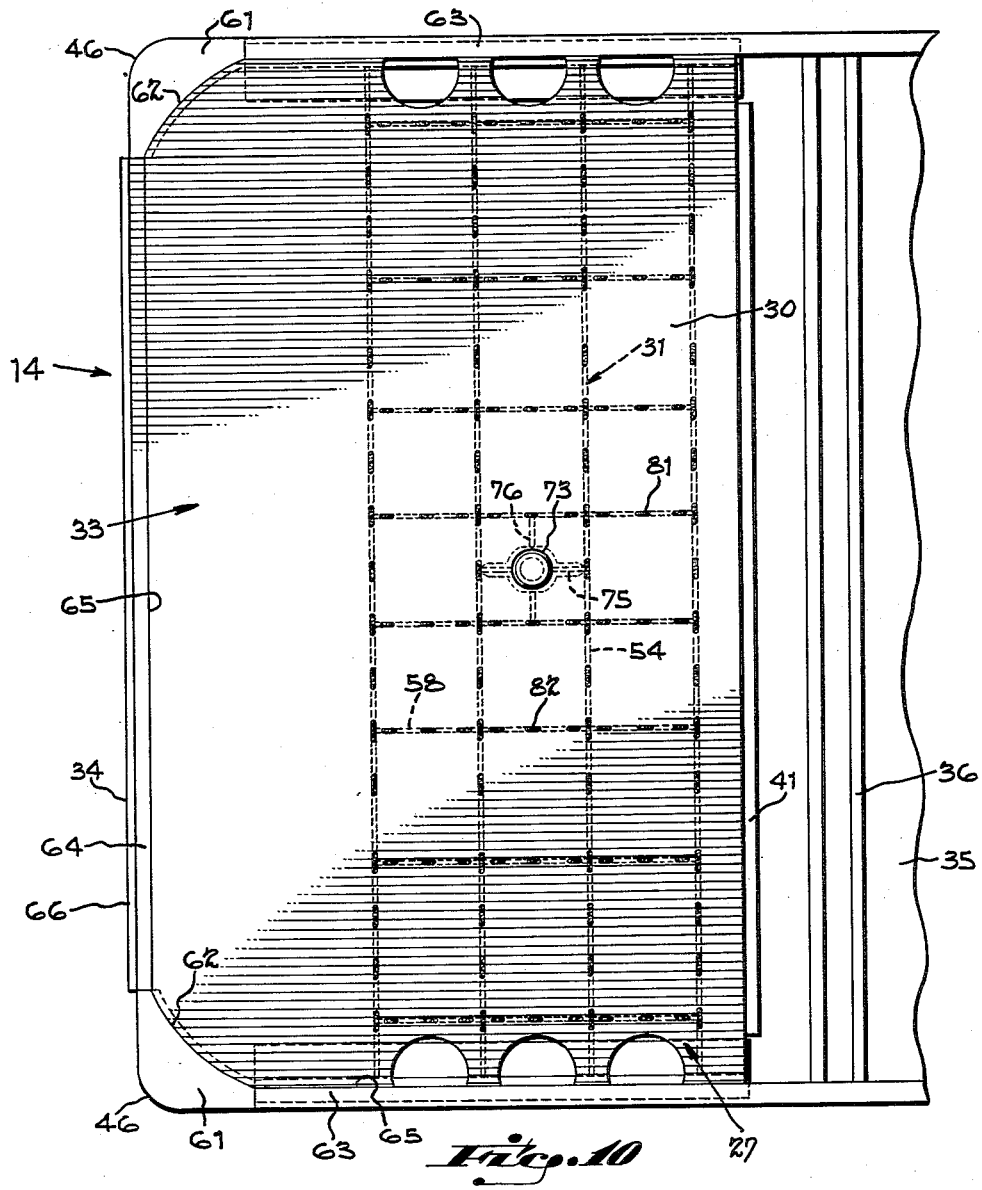

United States Patent Office 2,841,415
Patented July 1, 1958

2,841,415

UPPER FIFTH WHEEL LOAD-BEARING FRAME STRUCTURE FOR SEMI-TRAILERS

James J. Black, Cincinnati, Ohio, assignor to Trailmobile, Inc., Cincinnati, Ohio, a corporation of Delaware Application December 21, 1956, Serial No. 629,924

14 Claims. (Cl. 280—106)

This invention relates to semi-trailer roadway vehicles and is directed particularly to an improved upper fifth wheel construction by means of which the volumetric or cargo-carrying capacity of the semi-trailer is substantially increased without changing its over-all external dimensions.

A typical tractor-trailer combination of the type used for roadway hauling comprises a tractor which furnishes motive power, a detachable semi-trailer constituting a housing for receiving cargo, and a so-called "fifth wheel" structure for detachably coupling the tractor with the trailer. Fifth wheels of the type commonly used comprise a load-supporting plate and coupling jaws or other lock means, called the "lower fifth wheel," mounted at the rear end of the tractor and facing upwardly. An "upper fifth wheel," mounted at the front end of the semi-trailer, may comprise a load bearing plate having a king pin projecting downwardly for engagement by the jaws or lock means on the tractor and for load-supporting engagement of the respective fifth wheel plates, with one another. The tractor unit has front and rear wheels, but the semi-trailer has rear wheels only plus a front prop. The latter normally resides in an elevated, out-of-the-way position when the front end of the trailer is carried by the fifth wheel of the tractor to which the trailer is coupled, but the prop is lowered into engagement with the ground for supporting the front end of the trailer when the trailer is docked or when the tractor is uncoupled.

Although the details of the internal structures of fifth wheels vary according to the different makes and types of units, the lower and upper fifth wheels of the different makes and types are generally interchangeable to permit one tractor to serve various semi-trailers, and vice versa.

In order for various tractors and trailers to be coupled interchangeably, it is requisite that the elevation of the lower fifth wheel elements on the tractor and the upper fifth wheel plate and king pin elements of the semi-trailer be located substantially uniformly at a given level from the ground. The industry, by common practice, has set this level at approximately 47½" from the ground. In most designs some variation from this figure is permissible because of tiltable skids built into the lower (or upper) fifth wheel structure. Even so, however, wheel and tire diameters, plus the lowest allowable under-structure clearances establish a height of approximately 47½" as an irreducible minimum elevation of the lower face of the upper fifth wheel plates or support member above the ground. On the other hand, state laws limit the external dimensions of semi-trailers, as to maximum height and width. Therefore, the maximum width-height cargo-carrying capacity of a semi-trailer vehicle is governed by factors which are beyond the ability of the trailer manufacturer to change.

Since the static weight load of the front portion of the trailer, as well as the dynamic loading imposed by the cargo at the front portion of the semi-trailer must both be sustained by the upper fifth wheel structure built into the semi-trailer as well as by the lower fifth wheel structure carried on the tractor, and since the king pin and upper fifth wheel plate are located behind the front end of the semi-trailer and inwardly from the side members thereof, it is apparent that strong transverse beams must be utilized in the semi-trailer chassis to resist the forces acting on the upper fifth wheel structure during semi-trailer use. In the past, the thickness or height of these beams, plus the thickness of the trailer floor and the thickness of the upper fifth wheel plate has totaled approximately 8½". This dimension, coupled with the minimal 47½" height of the bottom face of the upper fifth wheel plate from the ground, has established a level of approximately 56" as the minimum elevation of the cargo floor at the inside of the semi-trailer above the ground, at least at the front end of the vehicle in the area above the fifth wheel structure. In instances where smooth, uninterrupted floor extending throughout the entire length of the semi-trailer is desired or required by service conditions, the high-level floor is carried all the way back to the rear of the vehicle. More recently, the so-called drop frame design has been employed where the floor level is high at the front above the fifth wheel but drops to the lowest permissible level to eliminate wheel housings rearwardly beyond that point. Thus, the floor in a "drop floor" semi-trailer is interrupted as one approaches the front end by a step or raised portion located over the fifth wheel area. For given external dimensions the drop floor type of trailer has greater volumetric capacity than the design in which the floor level is carried uniformly to the rear from the top of the upper fifth wheel support beams, but semi-trailers of the drop floor design are inconvenient and slow to load because the step or lift interferes with or obstructs the conveyance of cargo at the foremost end of the trailer.

The principal objective of this invention has been to provide a semi-trailer having an uninterrupted or unobstructed floor but having greater cargo-carrying capacity than either a high level floor or drop level floor type trailer of the same external dimension.

More specifically, the objective of this invention has been to provide an upper fifth wheel structure having the same or a greater load sustaining capacity than conventional upper fifth wheel structures but having an overall thickness which is substantially less than the usual thickness or height thereof, such that the space commonly devoted to occupancy by the upper fifth wheel load-supporting beams may be used as cargo space without sacrifice of strength or load-supporting capacity. It is essential, of course, that the upper fifth wheel structure be not only capable of sustaining the vertical weight loads to which it is subjected but also of sustaining the complex stresses and twists to which it may be subjected during normal movement of the tractor-trailer combination over rough or uneven roads.

This invention, briefly, is predicated upon the discovery and determination that the foregoing objectives and requirements are accomplished and fulfilled with certainty by an upper fifth wheel structure which is thin or low in overall height, comprising a metal grid or lattice bounded and integrated at each of its faces by stress plates. This grid and membrane structure spans the side rails of the trailer chassis and carries the king pin. The upper and lower stress plates of the assembly constitute structural members respectively subjected to tensional or compressional forces depending upon the varying load reactions which are developed during use, with the stress plates structurally spaced apart and thereby stiffened by the intermediate grid or lattice to which the stress plates are fastened rigidly, as by welding. In addition to the load-supporting functions of the stress plates, however, the upper stress plate constitutes flooring at the forward portion of the semi-trailer; the nominal over-all thickness of the grid and stress plate structure permits it to reside within the side rail levels such that the top stress plate is flush with the level of the conventional flooring of the vehicle. In the same structure the lower face of the lower stress plate serves as an upper fifth wheel plate adapted for facial engagement with the lower fifth wheel of a tractor. Thus, without alteration of the normal tractor-trailer fifth wheel levels observed in the industry, the semi-trailer is provided with a continuous uninterrupted low-level floor with a gain of approximately 5 inches of cargo height. By this structure, a semi-trailer vehicle is furnished which has a strong and durable fifth wheel support structure, a floor which is continuous or uninterrupted by a lift or rise, and a volumetric capacity which is substantially greater than can be obtained through any upper fifth wheel structures now available, but without any alteration or departure from external dimensional limitations.

One embodiment of the present invention is illustrated in the accompanying drawings in which:

Figure 1 is a diagrammatic side elevation of a typical semi-trailer in docked position, equipped with an upper fifth wheel structure in accordance with the present invention, the space occupied by a conventional upper fifth wheel structure being shown by the dot-dash lines.

Figure 2 is an exploded view showing the upper and lower stress plates and intermediate grid constituting an assembly of an upper fifth wheel structure in accordance herewith.

Figure 3 is a top plan view of the front end portion of a semi-trailer floor made in accordance with the invention, as taken on the line 3—3 of Figure 1, the wall structure of the trailer body being omitted.

Figure 4 is a perspective view of the front end of the floor and upper fifth wheel structure.

Figure 5 is a fragmentary perspective view showing one way in which the upper and lower stress plates may be integrated by welding with the intermediate grid of the fifth wheel structure.

Figure 6 is an enlarged plan view similar to Figure 3, with the parts broken away to show interior details.

Figure 7 is a front elevation projected from Figure 6, showing the trailer chassis with which the upper fifth wheel of the present invention has been associated.

Figure 8 is a cross sectional view through the chassis and upper fifth wheel structure as taken along line 8—8 of Figure 6.

Figure 9 is a longitudinal sectional view similar to Figure 8 but taken along line 9—9 of Figure 6.

Figure 10 is a view looking up at the bottom of a trailer chassis carrying an upper fifth wheel structure of the present invention.

Figure 11 is an enlarged fragmentary sectional view through the upper fifth wheel king pin along line 11—11 of Figure 6.

Figure 12 is an enlarged fragmentary cross sectional view taken along line 12—12 of Figure 6, showing the front channel construction.

Figure 13 is an enlarged fragmentary sectional view taken along line 13—13 of Figure 6, detailing the side channel construction of the fifth wheel frame.

The typical semi-trailer shown diagrammatically in Figure 1, which has been selected to illustrate the principles of this invention, comprises in general, a main trailer frame 10 supporting the trailer body or cargo housing 11, the frame having road wheels 12 at its rearward end and a retractable landing gear or prop 13 at its forward end. Prop 13 is shown in its extended position supporting the forward portion of the semi-trailer which is uncoupled.

The low-level fifth wheel structure of this invention, which is indicated generally at 14, extends forwardly of the prop for engagement with the fifth wheel of a tractor (not shown). The king pin 15 projects downwardly from the fifth wheel structure, such that the coupling mechanism of the tractor establishes a draft connection with the king pin when the tractor is backed into coupling position.

The tractor fifth wheel may include a longitudinal slot leading to its coupling mechanism to guide the king pin as the tractor backs to its supporting position beneath the trailer fifth wheel structure 14. In addition, the tractor fifth wheel may be provided with upwardly inclined skid surfaces which elevate the forward end of the trailer as the tractor fifth wheel slides into coupling engagement. In coupled position, the weight load of the forward end of the trailer is carried by the structure 14 which rests upon the tractor fifth wheel. After being coupled, the prop 13 is adjusted either manually or in an automatic manner to the retracted position above the roadway surface.

The main trailer frame 10 may be of any suitable construction; as shown, for example, it comprises a pair of longitudinal rub rails 22 generally channel shaped in cross section, extending from the fifth wheel structure 14 rearwardly. The landing gear 13 is suspended from a pair of transverse channel irons 17 which are joined to the forward portion of the main frame 10.

The road wheels 12, in the present disclosure, are arranged in tandem and their axles 18 are carried by a tandem suspension which is shown diagrammatically at 20. The tandem suspension is joined to the main frame 10 by an undercarriage 16, which may consist of parallel beam members. The trailer body 11 overhangs the wheels on opposite sides and includes a series of cross bolsters 21 which have their opposite ends joined to the channel-shaped rub-rails 22 at opposite sides. The rub-rails 22 and bolsters 21, support the floor 23 of the vehicle (Figure 3) which, as shown, may be of wood planking. The rub-rails on opposite sides also support the wall panels and posts of the body as described later. It will be understood that the various details of the wheel suspension and main frame structure have not been illustrated in detail, since the present invention is directed particularly to the fifth wheel or support structure 14 centering about the king pin 15, as described later.

As viewed in Figures 1 and 4, the upper fifth wheel assembly 14 is structurally interconnected with the main trailer frame 10, or the body side walls thereof, but the improvement is noticeable in that the invention permits the main floor section 23 to be flush with the top surface of the fifth wheel structure. Thus, in the structure illustrated, the fifth wheel section 14 is bounded by a fifth wheel frame 24 which extends along the sides, and which also may extend across the front of the structure. The top surface of frame 24 is flush with the top surface of the main frame 10 and the adjoining ends of frames 24 and 10 are joined by connectors 25 at opposite sides. The structural interconnection may be fabricated as forgings or castings joined by welding or riveting. The fifth wheel frame 24 may be generally channel shaped in cross section similar to the rub-rails 22 of the main frame, but the construction is such that the lower surface of the fifth wheel section 14 may be in a higher plane than the lower surface of the main frame 10. The connectors 25 thus diverge downwardly as at 26 from the narrow frame 24 to the wider frame 10.

Since the fifth wheel frame 24 delineates the full thickness of fifth wheel section 14, the lower surface of the fifth wheel section, when the trailer is resting upon its landing gear (Figure 1), is supported at the approximate plane 47½" above the support surface, as indicated by arrow A, to receive a tractor fifth wheel of standard elevation.

As outlined earlier, fifth wheel assemblies utilized in the past have required beam structures of substantial thickness over the load-bearing fifth wheel area in order to provide the requisite strength. The old high level floor, as indicated by the broken line B in Figure 1, obviously reduces the cargo capacity, bearing in mind that the maximum height of the body is fixed. On the other hand, the later-developed drop frame construction created the raised portion over the fifth wheel area, as indicated diagrammatically by the broken line C in Figure 1, which interferes with loading and unloading the forward portion of the body. The lower floor level provided by present fifth wheel construction is indicated by the full line D in Figure 1.

Described generally, the load-bearing grid section 27 (Figures 2 and 4) of fifth wheel structure 14 extends transversely of the vehicle from the interior of one side channel 24 of the fifth wheel frame to the other, within the planes delineated by the upper and lower extremities, of the side channels. The grid assembly comprises an upper stress plate 28, a lower stress plate 30, a multi-directional grid or lattice 31, and the king pin 15 which projects downwardly below the lower stress plate 30 from the grid and from upper stress plate to which it is suitably fastened. The construction of the grid section is described in detail later.

As best shown in Figure 3, the fifth wheel assembly 14, of which the grid section 27 forms a part, is sectional and comprises a rearward connecting platform 32 extending from the wood flooring 23, the load-bearing grid section 27, and a forward platform 23 extending from the forward edge of the grid section to the front rail 34 of the fifth wheel frame. As shown in Figure 4, connecting platform 32 comprises a plate 35 reinforced by a series of transverse channel members 36 which have their upper edges welded or otherwise secured as at 37 to the plate.

The forward edge of the wood floor section 23 includes means such as a transverse rabbet or groove 38 forming a ledge spaced from the top surface of the top plate, on which the rearward edge of plate 35 is seated in flush or level relationship with the surface of the rest of the trailer floor. The edge of the plate may be secured by screws 40 passing downwardly and threaded through the transverse prop support channel 17 which resides below the wood floor (Figure 4). The forward edge of connecting plate 35 may be supported upon a strip 41 which underlies the upper stress plate 28 of grid section 27.

The opposite ends of the transverse channels 36 of connecting platform 32 are joined to the side channels 24 of the fifth wheel frame. The opposite ends of grid section 27 are also joined to the side channels 24, the arrangement being disclosed in detail later with reference to Figure 13.

The forward platform 33 comprises a top plate 42 supported by spaced longitudinal members 43, preferably right angular in cross section. The longitudinal members 43 may be welded to the lower stress plate as at 44 (Figures 9 and 12), while their forward ends are joined to the front cross rail 34 of the fifth wheel frame. Top plate 42 of the forward platform may be detachably secured to the longitudinal members 43 by screws as at 45 (Figure 6) to permit removal of the plate for access to the wiring or other components which may reside beneath the plate.

As viewed from above in Figure 3, the trailer body of the present disclosure is of square construction, the side channels 24, which form the fifth wheel frame, being joined to the cross rail 34 by means of corner brackets 46 which provide curved interconnection at the two corners. The corner brackets are generally similar in cross section to the side and end channels shown in Figures 12 and 13, the brackets and rails being joined by welding or riveting. It will be understood that if a rounded type of vehicle is built, then the side channels 24 may extend continuously or sectionally, as required, around the front radius of the vehicle.

As best shown in Figure 13, the side channels 24 of the fifth wheel frame are of composite construction, comprising an external channel 47, the web portion of which is configurated to provide an outwardly projecting rib 48, and an internal channel 50 seated within the external channel. The top flanges of the nested channels 47 and 50 facially engage one another as at 51 and the flange 52 of an angle member 53 overlies the double flanges, the several members preferably being welded as an integral unit. The wall structure of the trailer body is attached to the angle member 53 and is supported by the flanges 51 at the forward portion of the body. The walls, rearwardly of the fifth wheel section, in a similar manner (not shown), are joined to the rub-rails 22 which form the main frame 10; accordingly, the fifth wheel frame 24 forms an integral, load-bearing part of the trailer body.

It will be understood at this point, that the framing member at each side, comprising the external channel 47, interior channel 50, and angle member 53 may, if desired, be in the form of a one-piece extrusion for simplified manufacture.

As best shown in Figures 2 and 5, the grid or lattice 31 comprises the transverse ribs or bars 54, spaced apart from one another, and a plurality of longitudinal bars or ribs 58, the two sets of bars being interconnected with one another in cross formation. The geometrical pattern of the lattice is not critical structurally, but the square or rectangular pattern shown in the drawings is preferred because of the convenience of assembly which it affords.

As shown in Figure 13, the endwise portions 60 of the transverse bars 54 are shaped to fit beneath the flanges 51, while the top surface of the bars are flush with the lower surface of the upper stress plate 28. The transverse bars 54 are welded to the side channels and to the upper and lower stress plates as described later. It will be apparent at this point, that when the grid section 27 is resting upon a tractor fifth wheel, the major vertical and transverse stresses acting on the body are carried by the flanges 51 to the transverse bars 54 and are resisted in tension and compression by the upper and lower stress plates 28 and 30, by virtue of their spacing. Stresses acting in fore and aft directions are resisted in the same manner by the plates by virtue of the longitudinal bars 58 to which they are joined.

The vertical flange 55 of angle members 53 (Figures 12 and 13) is spaced inwardly from the outer edge of the external framing channel 47 and the wall panel 56 of the body overlies the flange and is secured to it by rivets or the like (not shown). The body posts 57, which may consist of channel shaped members, rise vertically from the external channel 47 along the exterior of wall panel 56 and are spaced from one another. The panel and post construction extends for the full length of the vehicle and across its forward end and carries the roof structure (not shown).

As noted earlier, the corner brackets 46 have generally the same cross section as the composite side channels 24 described above. As viewed from below (Figure 10), each corner bracket 46 includes a lower flange 61 having an arcuate inner edge which is welded as at 62 to the correspondingly shaped edge of the lower fifth wheel stress plate 30. It will be noted in this view, that the lower stress plate extends completely to the lower flange 63 of the external channel 47 and lower flange 64 of the forward cross rail 34 of the fifth wheel frame and is butt welded to it as at 65.

Described with reference to Figure 12, the forward cross rail 34 is generally similar in cross section to the side rails 24 of the fifth wheel frame, except that the internal channel 50 is omitted. The lower edge of the front channel 34 includes a semicircular bead 66 which is welded as at 67 to the vertical web of the front channel. The bead 66 occupies the same plate as the rubrail profile 48 of the side channels and its rounded surface acts as a bearing which engages the inclined guide surface of the tractor fifth wheel as the skid surface slides rearwardly into coupling position beneath the fifth wheel section.

The forward end portions of the longitudinal members 43, which support the forward connecting platforms 33, are fitted as at 68 between the flanges 70—70 of the forward channel 34. The ends of the angle members 43 may be secured by welding as at 71 to the vertical web of the cross channel 34. The cross channel 34 also includes an angle member 53, similar to the side channels, connecting the end wall panel 56 and posts 57 to the cross channel. The rearward ends of the longitudinal members 43 project beneath upper stress plate 28, such that the upper plate 42 is supported upon the angle members flush with the top plate 28 of the grid section.

In assembling the grid section, the lattice structure 31 preferably is fabricated first, the longitudinal bars 58 being butt welded as at 72 to the transverse bars 54 at their points of intersection. After the lattice unit is assembled, the king pin sockets 73 may be installed at the center of the lattice unit. As shown in Figures 2 and 11, the king pin socket 73 may be fabricated as a forging or casting having a bore sized to receive the shank 74 of the king pin 15, the socket having an integral pair of vertical reinforcing fins 75—75 projecting from diametrically opposed sides. The socket preferably is located with its reinforcing fins 75 projecting along the longitudinal axis of the vehicle to resist forces acting in fore and aft directions. In addition, the socket may be reinforced laterally by connector pieces 76—76 which are welded to the socket along opposite sides at right angles to the longitudinal fins 75. The longitudinal and transverse pieces have their outer ends welded as at 77 (Figures 6 and 9) to the grid bars bounding the opening in which the king pin is to be positioned.

The top stress plate 28 of the grid section preferably is assembled with the composite channels 24 and angles 53 welded in place; it is then inverted to receive the lattice unit 31. Thereafter, the assembled lattice section 31, also in an inverted position, is placed within the top stress plate. The bars are then welded as at 78 from above to the flanges, and as at 80 (Figure 5) to the top stress plate. Next, the bottom stress plate 30 is placed upon the opposite face of the lattice to be welded to the bottom edges of the bars. For this purpose, as best shown in Figure 10, the lower stress plate 30 is provided with longitudinal and transverse rows of slots or openings 81 arranged in a pattern conforming to the grid pattern, such that the edges of the grid bars reside in alignment with the openings. Weld metal 82 is then deposited in the slots to bond the grid rigidly to the lower stress plate 30.

Both the upper and lower stress plates are provided with a central opening matching the outside shoulder diameter of the king pin socket 73. After the grid section is assembled, the socket is welded as at 83 to the plates (Figure 11), then the shank 74 of the king pin is inserted in the socket with its upper end flush with the surface of the upper stress plate 28. The king pin is secured permanently in place by applying a circumferential weld 84 about its upper end to secure it to its socket. In case the king pin should become worn after prolonged service, it may be removed by burning away the weld 84 and mounting a new one in its place. Since the lower stress plate bears against the tractor fifth wheel surface in the area surrounding the king pin 15, the weld metal is deposited sparingly in the slots 81 of the lower stress plate to provide a smooth bearing surface. Any weld metal which may protrude beyond the plane of the plate may be removed with a portable grinding wheel or the like. After the rearward connecting platform 32, a grid section 27, and forward platform 33 are assembled with the main frame 10, the wall panels, posts and roof may be erected to complete the trailer body.

It will be understood from the foregoing, that if the trailer chassis is not in and of itself strong enough to withstand the full loads to which the chassis is subjected, then the trailer body will be constructed to form a load-bearing beam structure built from the lower rails, the upper roof rails and the intermediate wall panels and posts. The weight load of the vehicle, which is carried by the rear wheels and fifth wheel (or prop when uncoupled), therefore is resisted in tension by the lower rails 22 and 24 of the main frame and fifth wheel frame, and in compression by the roof rails (not shown), road stresses being resisted locally by the wall panels or sheets 56 which are secured to the posts 57 by rivets or the like. Accordingly, the fifth wheel assembly, which is rigidly joined to the rails on opposite sides, forms an integral part of the beam-like body and has the same load-bearing strength and resistance to deflection under stress.

It will also be understood that in place of using side rails as shown, the body side walls, at their lower ends, and the front wall if desired, may be suitably shaped for structural interconnection with the upper fifth wheel to sustain the total loading of at least the front end of the vehicle.

The spacing of the bars 54 and 58 which form the fifth wheel grid, the spacing of the stress plate forms one another by the grid bars, and the thickness of the metal used in the various parts, will of course, depend upon the load capacity of the vehicle on which the structure is to be utilized, but in any event, the arrangement permits a relatively thin assembly to provide remarkably high resistance to deflection and to twisting under normal or complex road conditions. For example, an assembly of elements as shown in Figure 2, have a deflection at the king pin of less than 1/16 of an inch under a 33,000 pound load with a 3/16" thick high tensile steel for the stress plates, with grid strips 2 3/8" high and 3/16" thick of similar high tensile steel. In this example, the transverse bars are arranged on approximately 9" centers and the longitudinal bars are substantially as shown in Figure 2 in a fifth wheel structure having an over-all width of approximately 8 feet. Such an assembly has an over-all height of only 2 3/4", which is well within the space available between the channel flanges of conventional side rails of vehicles of this type.

Having described my invention, I claim:

1. An upper fifth wheel structure for a semi-trailer including lower side rails, said upper fifth wheel structure comprising a plurality of members forming a multi-directional grid, stress plates which are spaced apart by the grid and which respectively reside in rigid interconnection with the grid at the top and bottom faces of the grid, a king pin interconnected with said grid at a substantially central portion thereof and projecting beneath the lower one of said stress plates for coupling interconnection with a lower fifth wheel member carried on a tractor, the said upper fifth wheel structure being disposed between and connected to the side rails of the semi-trailer, the said semi-trailer having a floor over its main area rearwardly of said fifth wheel structure, said floor supported on said side rails, the top stress plate of said upper fifth wheel being substantially flush with the upper surface of said floor and constituting a continuation thereof in the area in which said upper fifth wheel assembly is located, the lower stress plate in the area thereof adjacent said king pin being adapted for facial engagement by the upper surface of a lower fifth wheel carried on a tractor, and both stress plates in conjunction with said grid constituting load carrying members through which the static and dynamic loading of said semi-trailer is supported from a tractor through said upper fifth wheel structure.

2. An upper fifth wheel structure for a semi-trailer including lower side rails, and side wall panel members connected thereto and to one another, said upper fifth wheel structure comprising a grid having a plurality of intersecting members in welded interconnection with one another, stress plate members which are spaced apart by said grid and which respectively reside in welded interconnection therewith at the top and bottom faces of said grid, a king pin in welded interconnection with said grid at a substantially central portion thereof and projecting beneath the lower one of said stress plates for coupling interconnection with a lower fifth wheel member carried on a tractor, the said upper fifth wheel assembly being disposed between and connected to the lower side rails of the semi-trailer, the said semi-trailer vehicle having a floor over its main area rearwardly of said upper fifth wheel assembly, said floor supported by said side rails, the top stress plate of said upper fifth wheel being substantially flush with the upper surface of said floor and constituting a continuation thereof in the area in which said upper fifth wheel assembly is located, the lower stress plate in the area thereof adjacent said king pin being adapted for facial engagement by the upper surface of a lower fifth wheel carried on a tractor, and both stress plates in conjunction with said grid constituting load carrying members through which the static and dynamic front end load of said semi-trailer is supported from a tractor, the thickness of the upper fifth wheel assembly, through said upper and lower stress plates and grid, not substantially exceeding three inches.

3. An upper fifth wheel structure for a semi-trailer including lower side rails, said upper fifth wheel structure comprising a grid spanning the side rails, said grid having its endwise portions respectively in rigid interconnection with the said lower side rails and residing substantially entirely within an area bounded by planes passing through the upper and lower extremities of said side rails, an upper stress plate in welded interconnection with the upper surface of said grid and said side rails, the said upper stress plate constituting a floor for said semi-trailer over a partial area of the same, a lower stress plate in welded interconnection with the lower face of said grid and with said side rails, said lower stress plate presenting a face adapted for engagement with the face of a lower fifth wheel member carried by a tractor, a king pin projecting rigidly in downward direction below the lower stress plate at a substantially central area of said grid and adapted for detachable interconnection with a lower fifth wheel of a tractor, said semi-trailer having other floor means carried by said lower side rails, the upper surface of said other floor means being flush with the upper surface of said upper stress plate and constituting a continuation thereof.

4. An upper fifth wheel structure for a semi-trailer including lower side rails, said upper fifth wheel comprising a lattice of intersecting members which in height approximate the height of said lower side rails, said lattice members being in welded interconnection with one another, said lattice spanning said side rails and being in welded interconnection with the side rails in the area bounded by planes respectively passing substantially through the upper and lower extremities of said side rails, a king pin projecting rigidly in a downward direction from said lattice, an upper stress plate in welded interconnection with the upper edges of said intersecting members and with said side rails, a lower stress plate in welded interconnection with the lower edges of said intersecting members and with said side rails and extending around said king pin, thereby providing a surface adapted for facial engagement by the plate of a lower fifth wheel carried on a tractor, the upper stress plate constituting a floor for said trailer vehicle over the area bounded thereby and the said trailer vehicle having other floor means constituting a substantially uninterrupted surface continuation of the floor provided by said upper stress plate, whereby the upper and lower stress plate in conjunction with said lattice constitute a thin load support membrane spanning the side rails, the upper surface of said load-support membrane comprising a continuing part of the vehicle floor and the lower surface of said membrane comprising a load bearing surface.

5. In a semi-trailer vehicle having a frame comprising inwardly facing channel members constituting side rails, a lattice formed of intersecting web members in welded interconnection, with one another spanning said side channel members and terminating substantially within the upper and lower extremities thereof, an upper stress plate in welded interconnection with the upper edgewise portions of said intersecting web members, a lower stress plate in welded interconnection with the lower edges of said interconnecting web members, the said upper and lower stress plates in conjunction with said web members, constituting a relatively thin membrane spanning said channel members in load-supporting relation thereto, a king pin projecting rigidly in downward direction from the lower stress plate and adapted for detachable engagement with the lower fifth wheel member carried on a tractor when the lower fifth wheel member of the tractor is in facial engagement with the lower surface of said lower stress plate, said semi-trailer vehicle having a floor in the area beyond said lattice, said floor carried by said lower side rails, said upper stress plate and said floor in the area therebeyond residing flush with one another.

6. In an upper fifth wheel structure for a semi-trailer including lower side rails, a load-bearing structure comprising a plurality of grid bars extending transversely of said lower side rails at the forward portion thereof, said grid bars having opposite ends secured to said side rails, upper and lower plates secured respectively to the top and bottom faces of said grid bars and constituting stress elements cooperating with said grid bars, a king pin in welded interconnection with at least said lower plate at a substantially central portion thereof and projecting beneath the lower plate for coupling interconnection with a fifth wheel carried on a tractor, said semi-trailer having a body joined rigidly to said lower side rails and rising upwardly therefrom along opposite sides, said body extending along said lower side rails and load-bearing structure having strength in compression sufficient to restrain said lower side rails from bending under load, the said semi-trailer having a floor over its main area rearwardly of said load-bearing structure, said floor carried by said lower side rails, the upper surface of said upper plate being substantially flush with the upper surface of said floor and constituting a continuation thereof at the forward portion of the semi-trailer, the said lower plate in the area thereof adjacent said king pin being adapted for facial engagement by the upper surface of a lower fifth wheel carried on a tractor, both of said plates in conjunction with said grid bars constituting a load-bearing structure through which the static and dynamic loading of said semi-trailer is carried by said body to the load-bearing structure and supported upon a tractor fifth wheel.

7. An upper fifth wheel structure for a semi-trailer having lower side rails, said upper fifth wheel structure comprising, a plurality of transverse grid bars spanning the lower side rails and having opposite endwise portions respectively in rigid interconnection with the said side rails, a plurality of longitudinal grid bars intersecting said transverse grid bars, said longitudinal and transverse grid bars having lower faces residing substantially in flush relationship with the lower surfaces of said side rails, a lower stress plate joined to the lower surface of said transverse and longitudinal grid bars, an upper stress plate joined to the upper surface of said grid said lower stress plate presenting a face adapted for engagement with the face of a fifth wheel carried by a tractor and a kingpin projecting rigidly in downward direction below the lower stress plate at a substantially central area of said plate for detachable interconnection with a fifth wheel of a tractor, said semi-trailer having a floor structure carried by said lower side rails, and the upper surface of said upper stress plate being a part of said floor structure as a substantially level continuation thereof.

8. An upper fifth wheel structure for a semi-trailer including lower side rails, said upper fifth wheel structure comprising a plurality of transverse grid bars spanning the lower side rails and having opposite endwise portions respectively in rigid interconnection with the said side rails, an upper plate member constituting a stress element joined to the upper surface of said transverse grid bars, a lower plate member constituting a stress element joined to the lower face of said transverse grid bars, said lower plate member being substantially flush with the lower extremities of said side rails and presenting a surface adapted for engagement with a fifth wheel carried by a tractor, a king pin socket including a vertical bore, said king pin socket residing between said plate members along a vertical axis, said socket having upper and lower ends joined to said upper and lower plate members, and a king pin having an upper portion secured in the bore of said socket and projecting downwardly below the said lower plate member for detachable interconnection with a fifth wheel of a tractor, said semi-trailer having a floor structure carried by said lower side rails, the upper surface of said floor structure being substantially flush with the top surface of the upper plate member.

9. In an upper fifth wheel structure for a semi-trailer including lower side rails, said upper fifth wheel structure having a plurality of generally transverse grid bars spanning the lower side rails and having opposite endwise portions respectively in rigid interconnection with the said side rails, a plurality of generally longitudinal grid bars intersecting said transverse grid bars, an upper stress plate joined to the upper surface of said transverse and longitudinal grid bars, the said upper stress plate constituting a floor for said semi-trailer over a partial area of the same, the lower faces of said grid bars being substantially flush with the lower extremities of said side rails, bearing means joined to the lower faces of said grid bars and presenting a load-bearing surface for supporting the semi-trailer with the fifth wheel structure thereof carried by a fifth wheel of a tractor, a king pin socket including a vertical bore, said king pin socket residing at a substantially central area of said upper stress plate and between the grid bars along a vertical axis, said socket having upper and lower ends joined to said upper stress plate and bearing means, and a king pin having an upper portion secured in the bore of said socket and projecting downwardly below the said bearing means for detachable interconnection with a fifth wheel of a tractor, said semi-trailer having a floor structure carried by said lower side rails, the upper surface of said floor structure being substantially flush with the top surface of the upper stress plate.

10. An upper fifth wheel structure for a semi-trailer including lower side rails, said upper fifth wheel structure comprising a plurality of intersecting members in welded interconnection with one another in the form of a grid, stress plates which are spaced apart by the grid and which respectively reside in welded interconnection with the grid at the top and bottom faces of the grid, a king pin in welded interconnection with said grid at a substantially central portion thereof and projecting beneath the lower one of said stress plates for coupling interconnection with a lower fifth wheel member carried on a tractor, the said upper fifth wheel structure being disposed between and connected to the side rails of the semi-trailer, the said semi-trailer having a floor over its main area rearwardly of said upper fifth wheel structure, said floor carried by said side rails, the top stress plate of said upper fifth wheel being substantially flush with the upper surface of said floor and constituting a continuation thereof in the area in which said upper fifth wheel assembly is located, and a wall structure joined rigidly to said lower side rails on opposite sides of the semi-trailer, said wall structure extending across the fifth wheel structure, said wall structure and the lower side rails comprising an integral beam structure extending for the length of the semi-trailer and across the said fifth wheel structure, the lower stress plate in the area thereof adjacent said king pin being adapted for facial engagement by the upper surface of a lower fifth wheel carried on a tractor, both stress plates in conjunction with said grid constituting load carrying members through which the static and dynamic loading of said semi-trailer is carried by said wall structure to the lower fifth wheel structure and is supported from a tractor through said upper fifth wheel structure.

11. An upper fifth wheel structure for a semi-trailer having lower side rails, said upper fifth wheel structure comprising a grid spanning the side rails, said grid having its endwise portions respectively in rigid interconnection with the lower side rails and residing substantially entirely within an area bounded by planes passing through the upper and lower extremities of said side rails, an upper stress element in welded interconnection with the upper surface of said grid and said side rails, the said upper stress element constituting a floor for said semi-trailers over a partial area of the same, a lower stress element in welded interconnection with the lower face of said grid and with said side rails, said lower stress elements presenting a face adapted for engagement with the face of a lower fifth wheel member carried by a tractor, a king pin projecting in a downward direction below the lower stress element at a substantially central area of said grid and adapted for detachable interconnection with a lower fifth wheel of a tractor, said semi-trailer having other floor means carried by said lower side rails, the upper surface of which other floor means being flush with the upper surface of said upper stress plate and constituting a continuation thereof, and a wall structure joined rigidly to said lower side rails along opposite sides of the semi-trailer, said wall structure rising upwardly from said side rails and extending for the full length of the semi-trailer and along the upper fifth wheel structure, said wall structure and the lower side rails constituting an integral beam structure of which the fifth wheel structure forms a part, whereby the load stresses of the semi-trailer are carried to the fifth wheel structure and resisted thereby when the fifth wheel structure is carried upon the fifth wheel member of a tractor.

12. An upper fifth wheel structure for a semi-trailer having lower side rails, said upper fifth wheel structure comprising, a plurality of transverse grid bars spanning the lower side rails and having opposite endwise portions respectively in rigid interconnection with the said side rails, a plurality of longitudinal grid bars intersecting said transverse grid bars, said longitudinal and transverse grid bars having lower faces residing substantially in flush relationship with the lower surfaces of said side rails, a lower stress plate joined to the lower surface of said transverse and longitudinal grid bars, said lower stress plate presenting a face adapted for engagement with the face of a fifth wheel carried by a tractor, a king pin projecting rigidly in downward direction below the lower stress plate at a substantially central area of said plate for detachable interconnection with a fifth wheel of a tractor, said semi-trailer having a floor structure carried by said lower side rails, said floor structure extending in a level plane from the said lower side rails and across the said grid bars, and a body structure joined rigidly to said lower side rails along opposite sides of the semi-trailer and rising upwardly therefrom, said body structure constituting a rigid beam extending continuously along the semi-trailer and along the fifth wheel structure, through which beam the load stresses of the semi-trailer are carried to the fifth wheel structure and resisted thereby when the fifth wheel structure is engaged upon the face of a fifth wheel carried by a tractor.

13. In a semi-trailer comprising side and front end members and having rear end road wheels supported therefrom, an upper fifth wheel assembly structurally interconnected with at least the said side members of said semi-trailer at the front end of the semi-trailer to sustain the total front end loading of the semi-trailer, the said upper fifth wheel assembly comprising a multi-directional grid, top and bottom plates at the opposite faces of said grid and unitized therewith by welding, the bottom plate forming a contact surface adapted to be supported facially by a tractor fifth wheel, whereby the front end of the semi-trailer is supported by the tractor through the said tractor and semi-trailer fifth wheel members when they are engaged, the said grid having a king pin connected thereto and including a portion retained axially in the said grid above the center of the grid and a portion extending below the said bottom plate for draft interconnection with a tractor fifth wheel, the said top plate constituting a cargo floor for a front endwise portion of the semi-trailer, and means forming a shelf spaced downwardly from the top surface of the top plate to support a continuing floor for the semi-trailer in level arrangement with the top surface of the top plate of the grid.

14. In a semi-trailer comprising side and front end members and having rear and road wheels supported therefrom, an upper fifth wheel assembly structurally interconnected with at least the said side members of said semi-trailer at the front end of the semi-trailer to sustain the total front end loading of the semi-trailer, the said upper fifth wheel assembly comprising a multi-directional grid, top and bottom plates located at the opposite faces of said grid and unitized therewith by welding, the bottom plate forming a contact surface adapted to be facially engaged by a tractor fifth wheel, whereby the front end of the semi-trailer may be supported by the tractor when the respective tractor and trailer fifth wheel members are engaged, the said grid having a king pin rigidly connected thereto and including a portion disposed axially in the grid above the center of the grid and a portion extending below the said bottom plate for draft interconnection with a tractor fifth wheel, the said top plate constituting a cargo floor for a front end portion of the semi-trailer, and means extending toward the rear end of said trailer from said top plate and forming a shelf spaced downwardly from the top surface of the top plate to support a continuing floor for the semi-trailer in level arrangement with the top surface of the top plate of the grid.

References Cited in the file of this patent

UNITED STATES PATENTS

| | | |
|---|---|---|
| 2,329,408 | Minium | Sept. 14, 1943 |
| 2,507,845 | Ziegler | May 16, 1950 |
| 2,540,400 | McHenry | Feb. 6, 1951 |
| 2,622,895 | Larsen | Dec. 23, 1952 |